(12) United States Patent
Suzuki

(10) Patent No.: US 12,388,938 B2
(45) Date of Patent: Aug. 12, 2025

(54) IMAGE PROCESSING APPARATUS, NON-TRANSITORY COMPUTER READABLE MEDIUM, AND METHOD

(71) Applicant: FUJIFILM Business Innovation Corp., Tokyo (JP)

(72) Inventor: Koichi Suzuki, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 370 days.

(21) Appl. No.: 17/891,264

(22) Filed: Aug. 19, 2022

(65) Prior Publication Data

US 2023/0308568 A1    Sep. 28, 2023

(30) Foreign Application Priority Data

Mar. 24, 2022  (JP) ................................. 2022-049027

(51) Int. Cl.
*H04N 1/04* (2006.01)
*H04N 1/00* (2006.01)

(52) U.S. Cl.
CPC ..... *H04N 1/00745* (2013.01); *H04N 1/00713* (2013.01); *H04N 1/00748* (2013.01)

(58) Field of Classification Search
CPC ........... H04N 1/00745; H04N 1/00748; H04N 1/00766
USPC ....................................................... 358/498
See application file for complete search history.

(56) References Cited

U.S. PATENT DOCUMENTS

| | | | | |
|---|---|---|---|---|
| 5,726,762 | A | * | 3/1998 | Akada ................ H04N 1/32358 358/401 |
| 2013/0286449 | A1 | * | 10/2013 | Fujiwara .............. H04N 1/3877 358/498 |
| 2017/0041478 | A1 | * | 2/2017 | Nakayoshi ......... H04N 1/00801 |
| 2021/0409564 | A1 | * | 12/2021 | Tomii ................ H04N 1/00713 |

FOREIGN PATENT DOCUMENTS

| | | |
|---|---|---|
| JP | H08-97991 A | 4/1996 |
| JP | 2001-117464 A | 4/2001 |
| JP | 2009-223696 A | 10/2009 |

OTHER PUBLICATIONS ip.com search history (Year: 2025)*

* cited by examiner

*Primary Examiner* — Moustapha Diaby
(74) *Attorney, Agent, or Firm* — Oliff PLC

(57) ABSTRACT

An image processing apparatus includes a processor configured to: acquire a read image of a document that is read by a document reading apparatus; and control an image output device such that the read image is outputted to a medium with a significance portion and an edge region prevented from overlapping, and a length of the medium in a sub scanning direction is increased in a case where the significance portion of the read image and the edge region in the sub scanning direction in which the read image is outputted to the medium overlap.

8 Claims, 9 Drawing Sheets

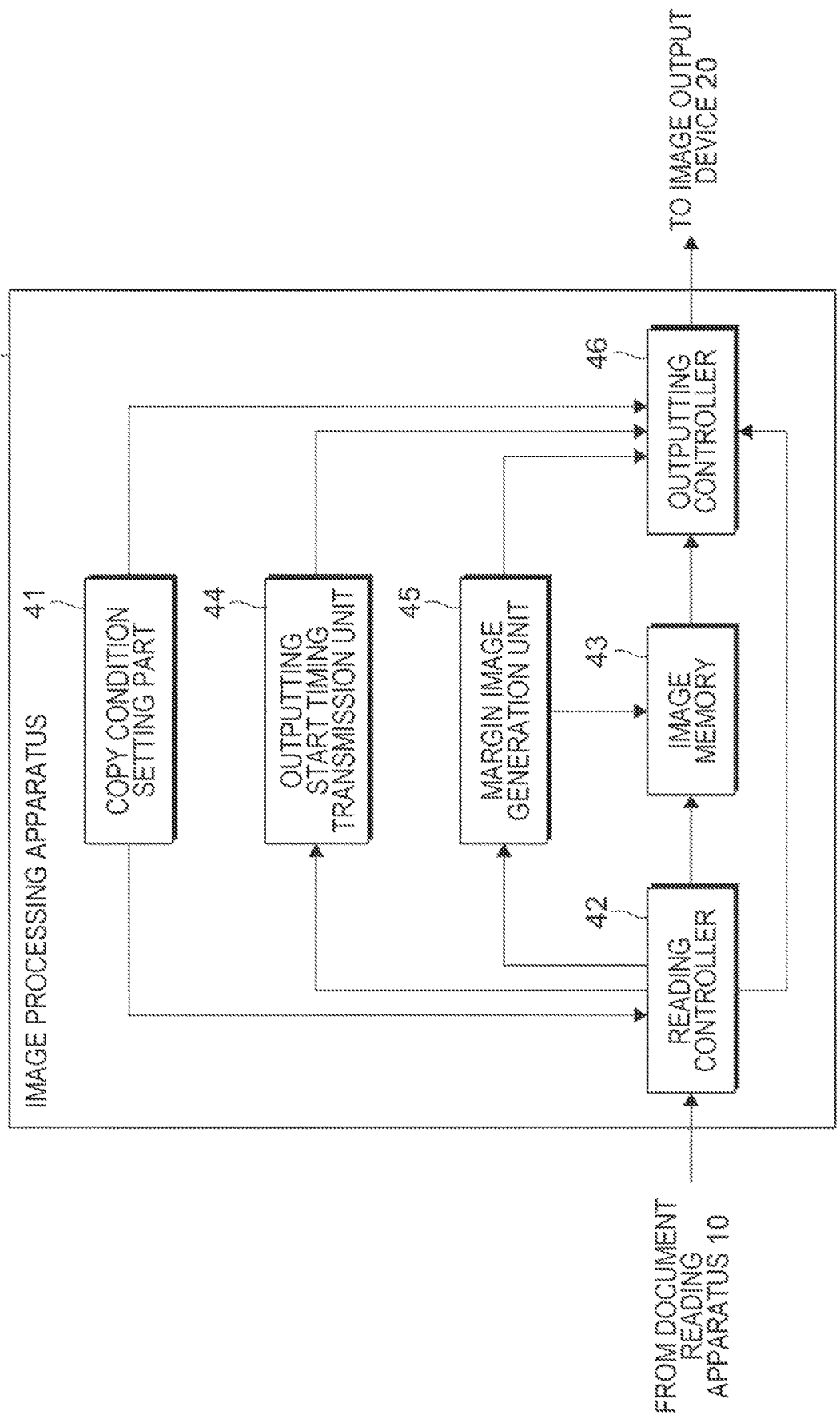

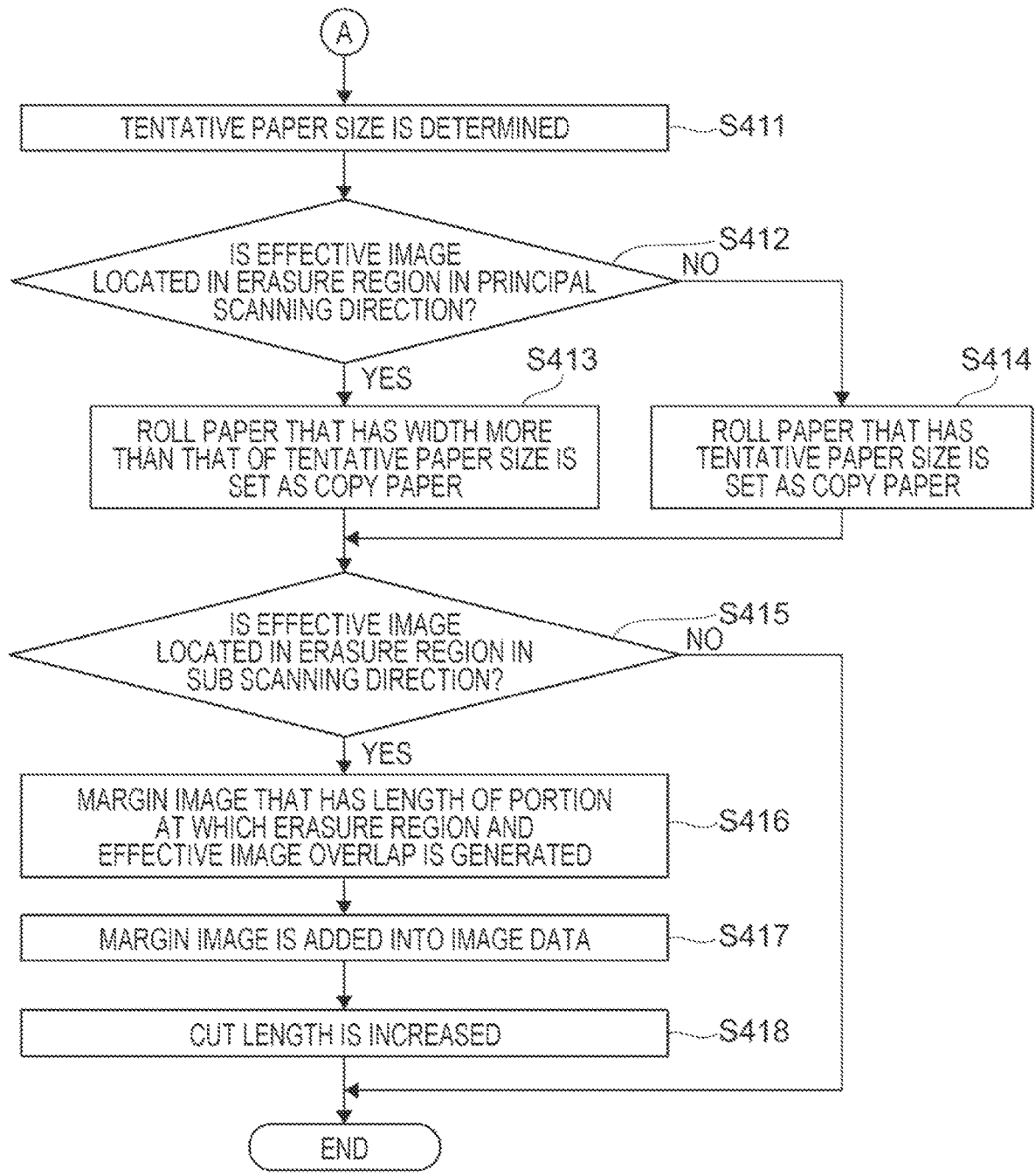

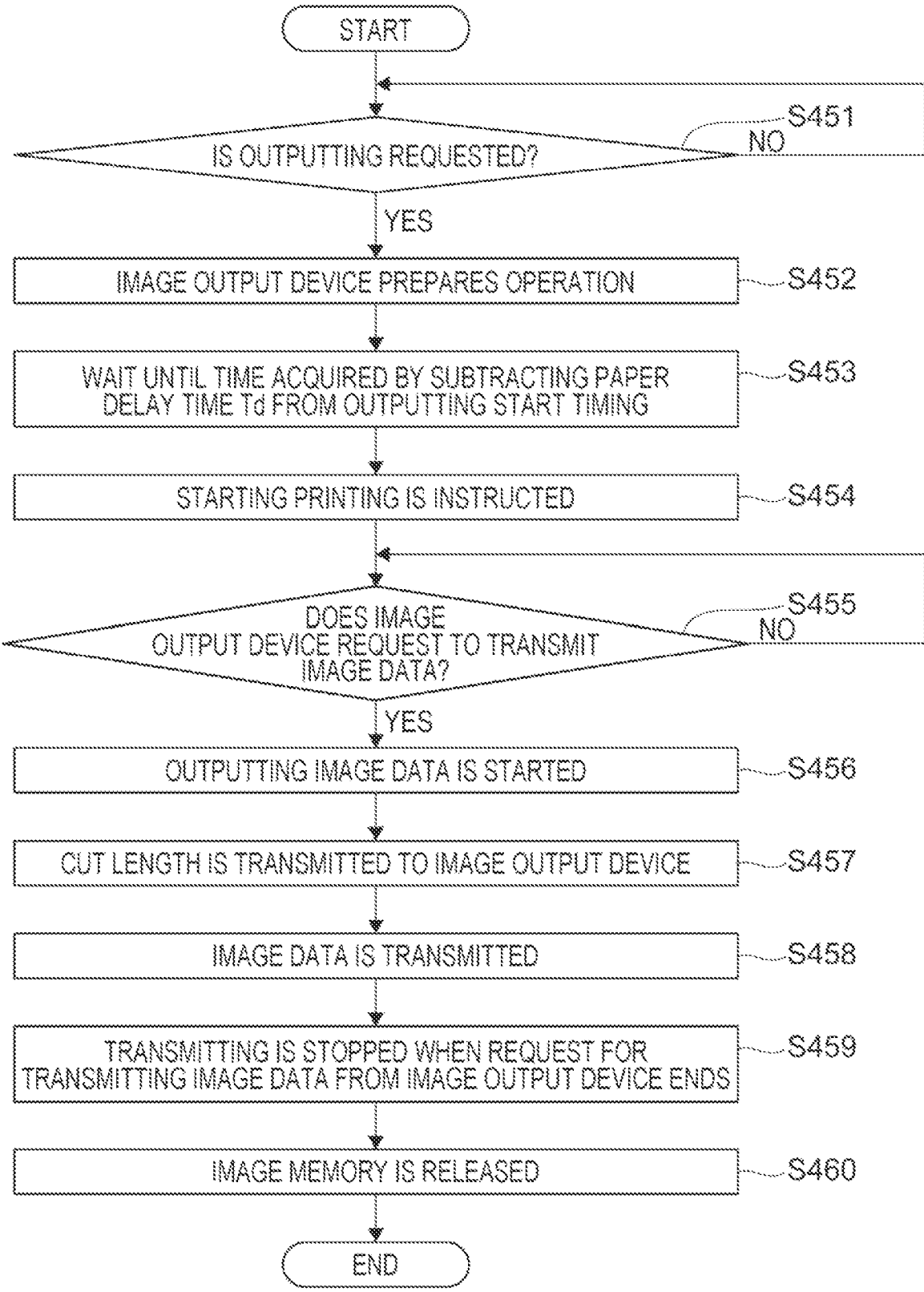

IMAGE PROCESSING APPARATUS, NON-TRANSITORY COMPUTER READABLE MEDIUM, AND METHOD

CROSS-REFERENCE TO RELATED APPLICATIONS

This application is based on and claims priority under 35 USC 119 from Japanese Patent Application No. 2022-049027 filed Mar. 24, 2022.

BACKGROUND

(i) Technical Field

The present disclosure relates to an image processing apparatus, a non-transitory computer readable medium, and a method.

(ii) Related Art

Japanese Unexamined Patent Application Publication No. 2001-117464 discloses an image forming apparatus that includes a document size detection unit that detects a document size, an output paper selection unit that selects output paper that has a size larger than the document size and closest to the document size, a centering portion that centers a document image on the middle of the output paper, and an image forming unit that transfers and outputs the document image to the output paper that is supplied form a paper tray.

SUMMARY

In some cases where the read image of a document that is read by a document reading apparatus is outputted to a medium, an edge region of the read image is erased. In these cases, if a medium that has a size larger than the size of the read image and closet to the size of the read image is selected regardless or whether a significance portion is located in the edge region of the read image, and the read image is outputted, the read image is outputted to the medium that has the large size even when the significance portion is not located in the edge region of the read image, and this results in a waste of the medium.

Aspects of non-limiting embodiments of the present disclosure relate to inhibition about the occurrence of a waste of a medium and prevention of erasure of an edge region of a read image when the read image of a document that is read by a document reading apparatus is outputted to the medium.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image processing apparatus including a processor configured to: acquire a read image of a document that is read by a document reading apparatus; and control an image output device such that the read image is outputted to a medium with a significance portion and an edge region prevented from overlapping, and a length of the medium in a sub scanning direction is increased in a case where the significance portion of the read image and the edge region in the sub scanning direction in which the read image is outputted to the medium overlap.

BRIEF DESCRIPTION OF THE DRAWINGS

An exemplary embodiment of the present disclosure will be described in detail based on the following figures, wherein:

FIG. 6 is a block diagram illustrating an example of the functional configuration of the image processing apparatus according to the exemplary embodiment of she present disclosure;

FIG. 7B is a flowchart of the reading routine of the image processing apparatus according to the exemplary embodiment of the present disclosure; and FIG. 8 is a flowchart of an outputting routine of the image processing apparatus according to the exemplary embodiment of the present disclosure.

DETAILED DESCRIPTION

An exemplary embodiment of the present disclosure will hereinafter be described in detail with reference to the attached drawings.

Summary of Present Exemplary Embodiment

According to the present exemplary embodiment, an image processing apparatus acquires a read image of a document that is read by a document reading apparatus and controls an image output device such that the read image is outputted to a medium with a significance portion and an edge region prevented from overlapping, and a length of the medium in a sub scanning direction is increased in a case where the significance portion of the read image and the edge region in the sub scanning direction in which the read image is outputted to the medium overlap.

The significance portion of the read image described herein is a portion of the read image for reporting meaningful information to a user. The portion for reporting the meaningful information may be the entire portion except for the color of a foundation or may be a portion that has a size equal to or more than a threshold with the result that pixels for colors other than the color of the foundation are coupled with each other. The portion for reporting the meaningful information may be a predetermined kind of part in such a portion. Examples of the predetermined kind of part include a part on which a character image is formed and a part on which a photographic image is formed. In the following description, the significance portion of the read image is an effective image.

The edge region of the medium is a region near an edge of the medium. How far the region near the edge of the medium is away from the edge of the medium may be determined in advance. The edge region of the medium may be any region, and an example thereof described later is an erasure region that is erased, for example, for preventing the interior of the image output device from being stained, and no image is printed thereon.

The medium is an object that is used to report information, and the image data is outputted thereto. Examples of the medium include paper and a plastic sheet. In the following description, paper is taken as an example.

To increase the length of the medium is to increase the length of the medium by changing a position at which the medium is cut.

Entire Configuration of Copy System

Figure 1:
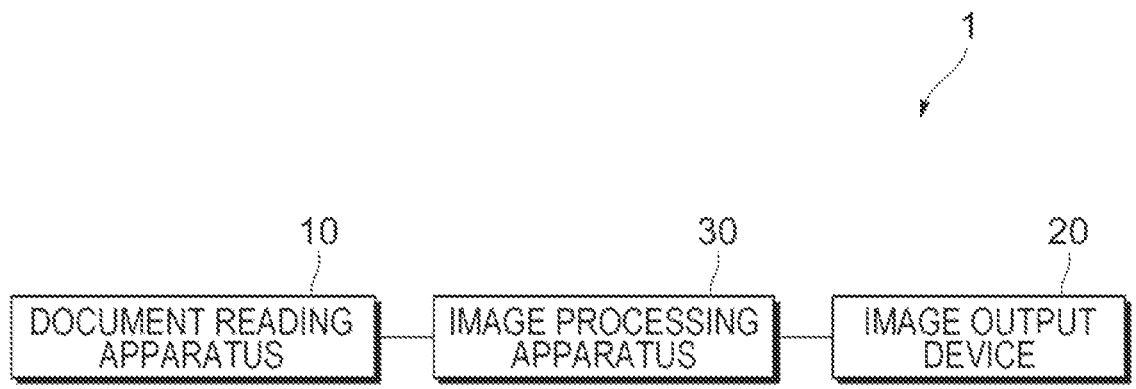
FIG. 1 is a block diagram illustrating an example of the entire configuration of a copy system according to the exemplary embodiment of the present disclosure.

FIG. 1 is a block diagram illustrating an example of the entire configuration of a copy system 1 according to the present exemplary embodiment. The copy system 1 includes a document reading apparatus 10, an image output device 20, and an image processing apparatus 30 as illustrated. The document reading apparatus 10 reads a document and outputs the image data thereof. The image output device 20 transfers an image to paper, based on the image data and discharges the paper. The image processing apparatus 30 acquires the image data from the document reading apparatus 10 and processes the image data for an output to the image output device 20. The copy system 1 is capable of making a synchronous cutting copy. The synchronous cutting copy is a copy acquired in a manner in which copy paper is cut so as to be suitable for the length of the document.

Hardware Configuration of Document Reading Apparatus

Figure 2:
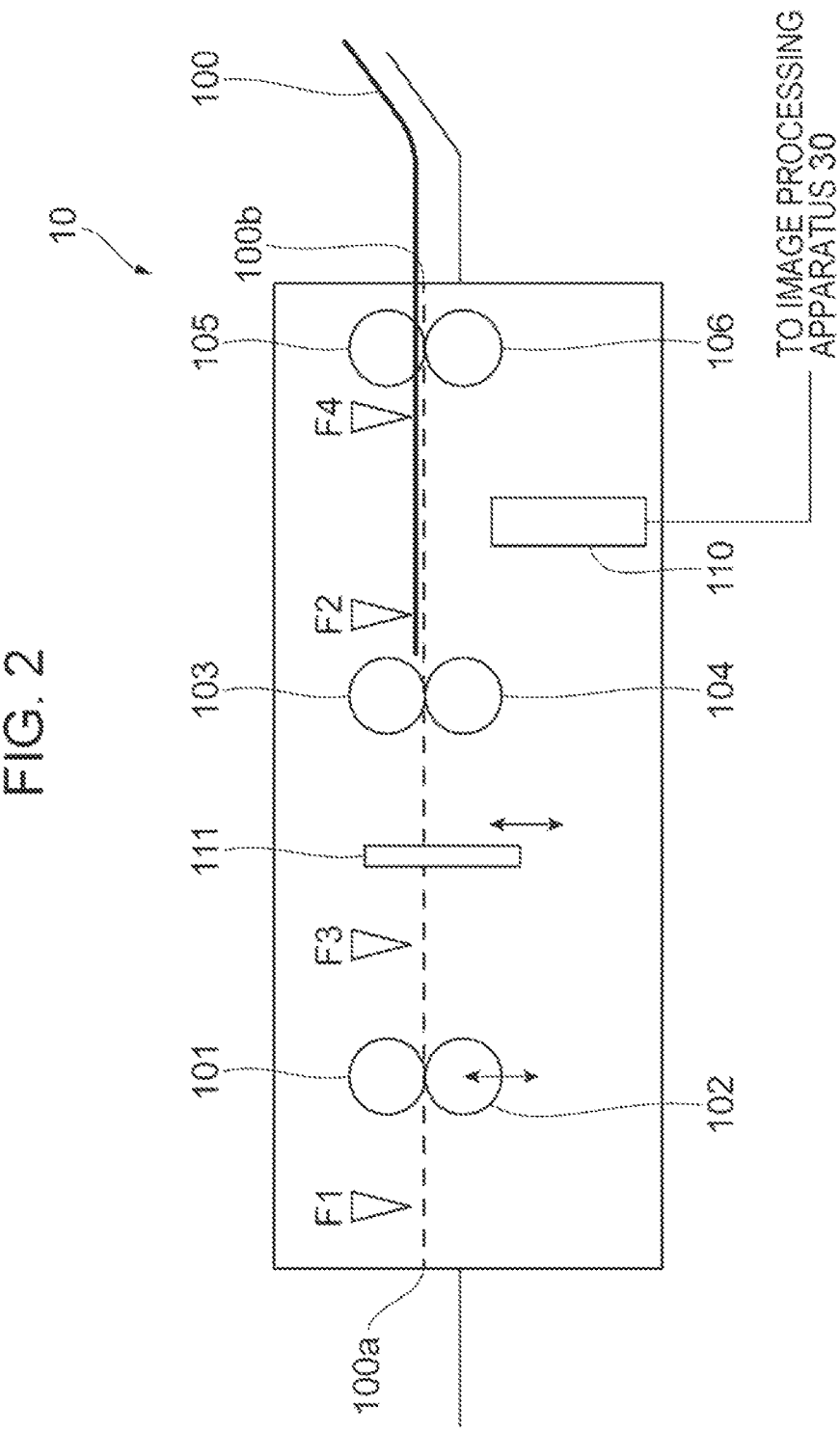
FIG. 2 illustrates an example of the hardware configuration of a document reading apparatus according to the exemplary embodiment of the present disclosure.

FIG. 2 illustrates an example of the hardware configuration of the document reading apparatus 10 according to the present exemplary embodiment.

In the document reading apparatus 10, transport rollers 101 to 106 for transporting a document 100 in a transport direction are disposed. As for the transport rollers 101 to 106, two rollers that are arranged in the vertical direction in FIG. 2 are paired for three transport units in total. The document 100 enters via a document entrance 100a, is transported by the transport rollers 101 and 102 corresponding to the first transport units, the transport rollers 103 and 104 corresponding to the second transport units, and the transport rollers 105 and 106 corresponding to the third transport units in turn, and is discharged via a document exit 100b.

A reading sensor 110 is disposed between the transport rollers 103 and 104 corresponding to the second transport units and the transport rollers 105 and 106 corresponding to the third transport units. The reading sensor 110 is a one-dimensional sensor that is acquired by arranging a large number of light detection sensors in a direction perpendicular to the transport direction of the document 100. The light detection sensors detect reflection light from a surface of the document 100. The output signals of the light detection sensors are sequentially scanned in a predetermined period and sequentially converted into digital signals. Consequently, the image data of a straight portion that is included in the entire image on the surface of the document 100 and that faces the light detection sensors is generated. The image data is continuously generated while the document 100 is transported, and the image data that represents the image on the surface of the document 100 is consequently generated. The image data that is acquired by the reading sensor 110 is transmitted to the image processing apparatus 30.

Sensors F1 to F4 for detecting edge portions of the document 100 that pass are disposed at points on a transport path for the document 100. A gate 111 is disposed between the transport rollers 101 and 102 corresponding to the first transport units and the transport rollers 103 and 104 corresponding to the second transport units. The gate 111 opens only while the reading sensor 110 reads the document 100 and allows the document 100 to pass toward the second transport units.

Hardware Configuration of Image Output Device

Figure 3:
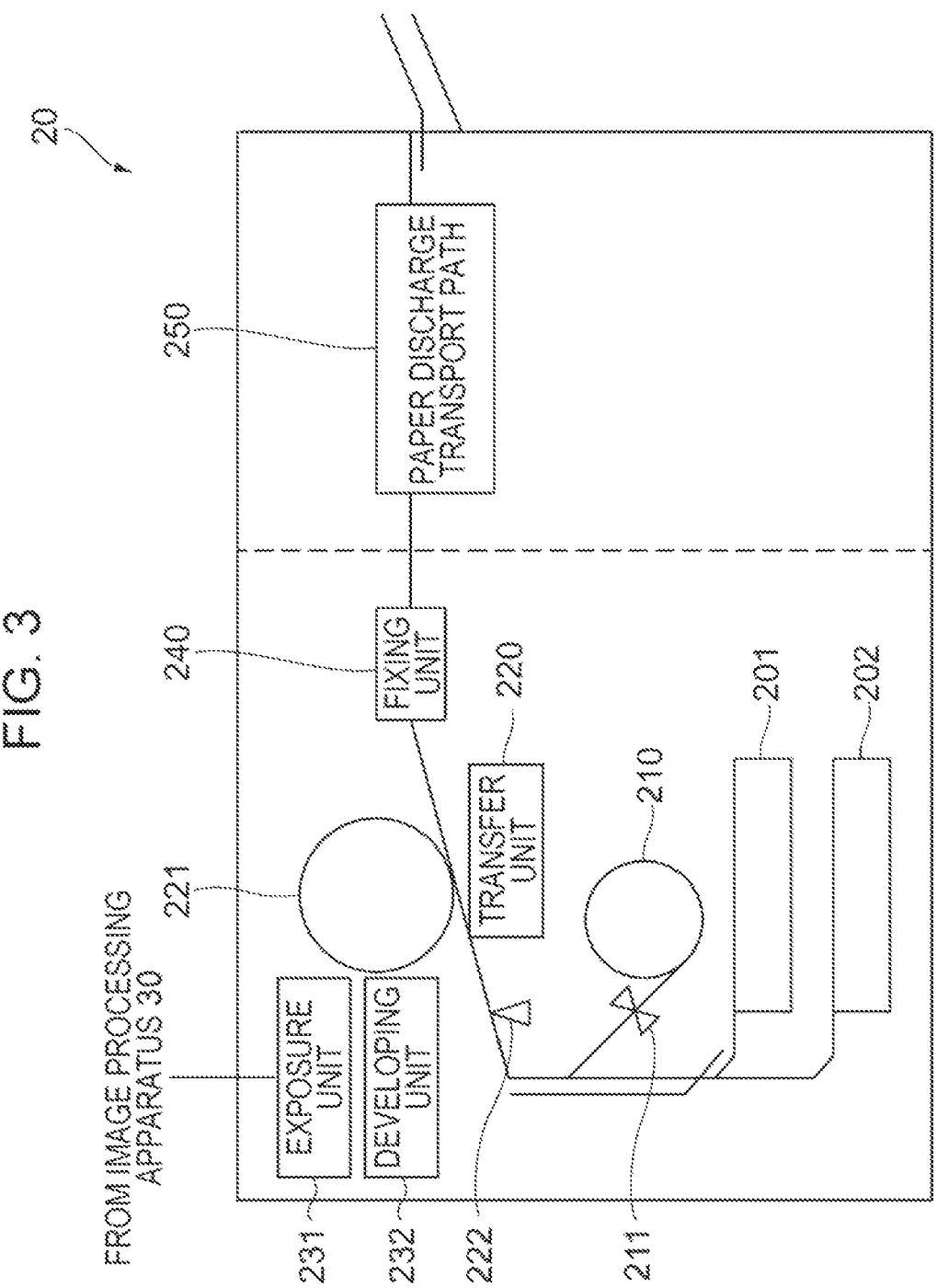
FIG. 3 illustrates an example of the hardware configuration of an image output device according to the exemplary embodiment of the present disclosure.

FIG. 3 illustrates an example of the hardware configuration of the image output device 20 according to the present exemplary embodiment.

The image output device 20 includes cut paper supplying units 201 and 202 and a roll paper supplying unit 210 as illustrated. The image output device 20 also includes a cutter 211 for cutting copy paper that is fed from the roll paper supplying unit 210. Copy paper in the cut paper supplying units 201 and 202 or the copy paper that is wound around the roll paper supplying unit 210 is selected for copying, based on an operation of the user. The selected copy paper is transported to a transfer unit 220 in response to an instruction for outputting from the image processing apparatus 30. A resist sensor 222 that detects the copy paper that comes is disposed in front of the transfer unit 220. An exposure unit 231 exposes the surface of a transfer drum 221 that rotates at a predetermined speed to light, based on the image data that is supplied from the image processing apparatus 30 and forms a latent image depending on the image data. A developing unit 232 supplies toner to the surface of the transfer drum 221 on which the latent image is thus formed and forms a toner image depending on the image data on the surface of the transfer drum 221. The transfer unit 220 presses the copy paper against the surface of the transfer drum 221 and transfers the toner image on the surface of the transfer drum 221 to the copy paper. The copy paper to which the toner image is thus transferred is subjected to a fixing process by a fixing unit 240 and is subsequently discharged via a paper discharge transport path 250.

Hardware Configuration of Image Processing Apparatus

Figure 4:
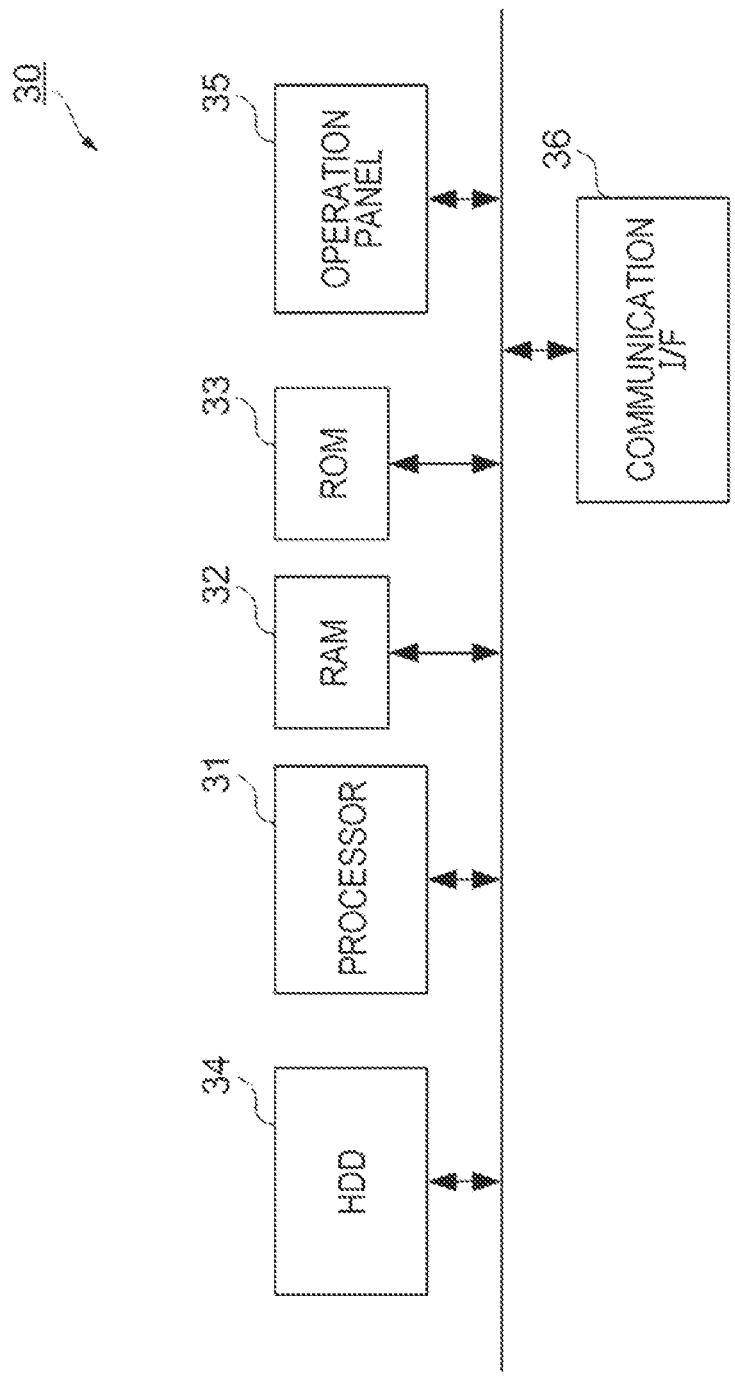
FIG. 4 illustrates an example of the hardware configuration of an image processing apparatus according to the exemplary embodiment of the present disclosure.

FIG. 4 illustrates an example of the hardware configuration of the image processing apparatus 30 according to the present exemplary embodiment. The image processing apparatus 30 includes a processor 31, a random access memory (RAM) 32, a read only memory (ROM) 33, a hard disk drive (HDD) 34, an operation panel 35, and a communication interface (referred to below as a "communication I/F") 36 as illustrated.

The processor 31 loads various programs that are stored in, for example, the ROM 33 into the RAM 32 and runs the programs to perform the functions of the image processing apparatus 30 described later.

The RAM 32 is a memory that is used, for example, as a work memory for the processor 31.

The ROM 33 is a memory that stores, for example, the various programs that are run by the processor 31.

The HDD 34 stores, for example, the image data that is acquired by reading the document by using the document reading apparatus 10, and an example thereof is a magnetic disk device.

The operation panel 35 displays various kinds of information and receives an operation input from the user, and an example thereof is a touch screen. The operation panel 35 includes a display that displays various kinds of information and a position detecting sheet that detects a position that is specified by a finger or an instruction unit such as a stylus pen. A display and a keyboard may be used instead of the touch screen.

The communication. I/F 36 transmits and receives various kinds of information to and from another device via a communication line not illustrated.

Summary of Operation of Copy System

Figure 5A:
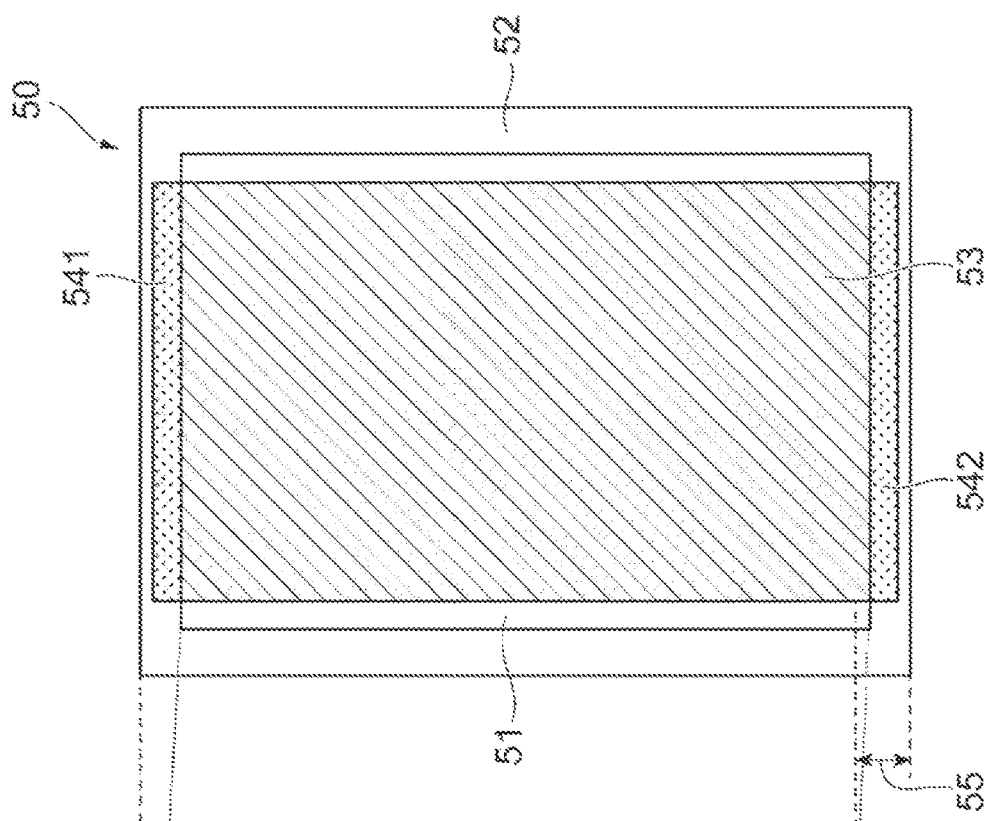
FIG. 5A and FIG. 5B illustrate an example of arrangement of a read image of a document on copy paper.
Figure 5B:
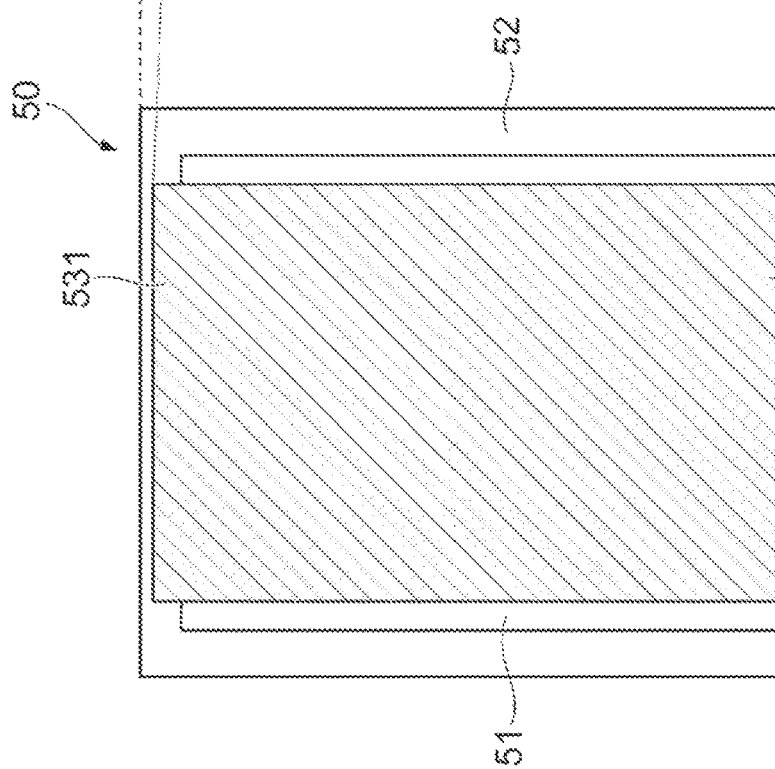

FIG. 5A and FIG. 5B illustrate an example of arrangement of a read image of a document that is read by the document reading apparatus 10 on copy paper 50 that is outputted by the image output device 20. The copy paper 50 has a printable region 51 in which the arranged read image is printed and an erasure region 52 in which the arranged read image is not printed but is erased.

The copy paper 50 has margins at edge portions in a principal scanning direction. It is thought that the read image of the document is printed with an effective image 53 extending to the vicinity of a leading edge portion and a trailing edge portion in the sub scanning direction. In this case, as illustrated in FIG. 5A, the effective image 53 is within the printable region 51 in the principal scanning direction. However, regions 531 and 532 of the effective image 53 protrude from the printable region 51 in the sub scanning direction and overlap the erasure region 52.

In view of this, according to the present exemplary embodiment, in the case where the effective image 53 is located in the erasure region 52 as Illustrated in FIG. 5B, margin images 541 and 542 that have a height equal to the height of each region in which the effective image 53 and the erasure region 52 overlap are added into the read image of the document and outputted. As illustrated by using an arrow 55, the copy paper 50 is cut so as to be extended due to the added margin images 541 and 542. In FIG. 5B, dotted lines for assisting the user to cut the effective image 53 may be printed between the effective image 53 and the margin image 541 and between the effective image 53 and the margin image 542 although this is not illustrated.

Functional Configuration of Image Processing Apparatus

FIG. 6 is a block diagram illustrating an example of the functional configuration of the image processing apparatus 30 according to the present exemplary embodiment. The image processing apparatus 30 includes a copy condition setting part 41, a reading controller 42, an image memory 43, an outputting start timing transmission unit 44, a margin image generation unit 45, and an outputting controller 46 as illustrated.

The copy condition setting part 41 sets a copy condition that the user instructs on the operation panel 35. Examples of the copy condition include a selection from a fixed form copy and a synchronous cutting copy, magnification, paper, and an operation mode for the synchronous cutting copy.

The reading controller 42 controls the document reading apparatus 10 that reads the document.

Specifically, the reading controller 42 determines whether a document is inserted via the document entrance 100a and acquires the entire storage area in the image memory 43 if it is determined that the document is inserted.

The reading controller 42 instructs the document reading apparatus 10 to read the document and acquires the image data that is transmitted from the document reading apparatus 10 in response to the instruction. The reading controller 42 causes the image memory 43 to store the acquired image data.

The reading controller 42 determines the size of the document that is read by the document reading apparatus 10 and sets the cut length of the copy paper, based on this for a request for cutting.

The reading controller 42 selects the copy paper that is used, based on the determined size of the document. Specifically, the reading controller 42 determines that a tentative paper size is equal to the size of the document. Whether a region of the image data that overlaps the erasure region in the principal scanning direction is a margin, that is, whether the effective image is located in the region that overlaps the erasure region in the principal scanning direction is determined. If the effective image is located in the region that overlaps the erasure region in the principal scanning direction, the reading controller 42 selects roll paper that has a size larger than the tentative paper size and that has a width closet to that of the tentative paper size as the copy paper. If the effective image is not located in the region that overlaps the erasure region in the principal scanning direction, the reading controller 42 selects roll paper that has the tentative paper size as the copy paper. The reading controller 42 determines whether a region of the image data that overlaps the erasure region in the sub scanning direction is a margin, that is, whether the effective image is located in the region that overlaps the erasure region in the sub scanning direction. If the effective image is located in the region that overlaps the erasure region in the sub scanning direction, the reading controller 42 delegates control to the margin image generation unit 45 or the outputting controller 46.

The reading controller 42 performs the process as an example in which the read image of the document that is read by the document reading apparatus is acquired.

The image memory 43 stores the image data that the reading controller 42 reads from the document reading apparatus 10. An example of the image memory 43 is the HDD 34.

The outputting start timing transmission unit 44 acquires a wait time T from a reading start timing until the outputting start timing if it is determined that reading and outputting are simultaneously progressed depending on the copy condition that is set by the copy condition setting part 41. For example, the outputting start timing transmission unit 44 acquires a print delay time T that is used to finish reading the document that has a predetermined maximum document length and finish outputting at the same time. The outputting start timing transmission unit 44 calculates the outputting start timing, based on the reading start timing and the wait time T and transmits the calculated outputting start timing to the outputting controller 46.

if the reading controller 42 determines that the effective image is located in the region of the image data that overlaps the erasure region in the sub scanning direction, the margin image generation unit 45 generates a margin image that has a height equal to the height of a region in which the effective image and the erasure region overlap. The margin image generation unit 45 composites the margin image with the image data that is stored in the image memory 43. For example, if it is determined that the effective image is located in the region that overlaps the erasure region at the leading edge portion of the image data in the sub scanning direction, the margin image generation unit 45 adds the margin image into the image data at the leading edge. If it is determined that the effective image is located in the region that overlaps the erasure region at the trailing edge portion of the image data in the sub scanning direction, the margin image generation unit 45 adds the margin image into the image data at the trailing edge. The margin image generation unit 45 rewrites the image data with which the margin image is composited in the image memory 43.

According to the present exemplary embodiment, the margin image generation unit 45 performs this process as an example in which the image output device is controlled such that a margin image that has the length of an overlapping portion between the significance portion and the edge region in the sub scanning direction is added into the edge region of the read image and is outputted to the medium.

According to the present exemplary embodiment, the margin image generation unit 45 performs this process as an example in which the image output device is controlled such that a margin image that has the length of an overlapping portion between the significance portion and the leading edge region in the sub scanning direction is added into the leading edge region of the read image and is outputted to the medium in the case where the significance portion and the leading edge region overlap.

The margin image generation unit 45 increases the cut length by the height of the margin image and sets the increased cut length.

According to the present exemplary embodiment, the margin image generation unit 45 performs this process as an example in which the image output device is controlled such that the medium is cut at a position suitable for the length of the margin image in the sub scanning direction.

The outputting controller 46 controls the image output device 20 that outputs the image data that is read from the image memory 43.

Specifically, the outputting controller 46 determines whether the reading controller 42 requests outputting and causes the image output device 20 to prepare the operation thereof if outputting is requested. The outputting controller 46 instructs the image output device 20 to start printing at a time acquired by subtracting a paper delay time Td from the outputting start timing that is transmitted from the outputting start timing transmission unit 44. The outputting controller 46 outputs the image data that is read from the image memory 43 to the image output device 20 after the instruction for starting printing in response to a request for transmitting the image data from the image output device 20. The outputting controller 46 outputs the image data that is read from the image memory 43, with which the margin image is composited, to the image output device 20 particularly in the case where the margin image generation unit 45 generates the margin image and composites the margin image with the image data.

If the reading controller 42 determines that the effective image is located in the region of the image data that overlaps the erasure region in the sub scanning direction, the outputting controller 46 may prevent the effective image and the erasure region from overlapping without the use of the margin image generation unit 45. For example, if it is determined that the effective image is located in the region that overlaps the erasure region at the leading edge portion of the image data in the sub scanning direction, the outputting controller 46 may change a position at which printing starts by the height of the region in which the effective image and the erasure region at the leading edge portion overlap. That is, the outputting controller 46 may control the image output device 20 such that the region in which the effective image and the erasure region at the leading edge portion overlap is not printed, but the copy paper is transmitted. If it is determined that the effective image is located in the region that overlaps the erasure region at the trailing edge portion of the image data in the sub scanning direction, the outputting controller 46 does not generate a margin image in the region in which the effective image and the erasure region at the trailing edge portion overlap but may form a margin at the trailing edge portion.

According to the present exemplary embodiment, the outputting controller 46 performs this process as an example in which the image output device is controlled such that the read image is outputted to the medium with the significance portion and the edge region prevented from overlapping in the case where the significance portion of the read image and the edge region in the sub scanning direction in which the read image is outputted to the medium overlap.

According to the present exemplary embodiment, the outputting controller 46 performs this process as an example in which the image output device is controlled such that the read image starts to be outputted to the medium from a position with a margin that has the length of an overlapping portion between the significance portion and the leading edge region in the sub scanning direction maintained in the case where the significance portion and the leading edge region overlap.

According to the present exemplary embodiment, the outputting controller 46 performs this process as an example in which the image output device is controlled such that a margin that has the length of an overlapping portion between the significance portion and the trailing edge region in the sub scanning direction is maintained in the case where the significance portion and the trailing edge region overlap.

The outputting controller 46 reads the cut length that is set by the reading controller 42 and transmits the cut length to the image output device 20. The outputting controller 46 transmits the increased cut length to the image output device 20 instead of the cut length that is set by the reading controller 42 particularly in the case where the margin image generation unit 45 sets the increased cut length. The outputting controller 46 may transmit the cut length that is increased by the length of the margin to the image output device 20 instead of the cut length that is set by the reading controller 42 particularly in the case where a margin that has a height equal to the height of the region in which the effective image and the erasure region at the trailing edge portion overlap is formed at the trailing edge portion.

According to the present exemplary embodiment, the outputting controller 46 performs this process as an example in which the image output device is controlled such that the length of the medium in the sub scanning direction is increased.

According to the present exemplary embodiment, the outputting controller 46 performs this process as an example in which the image output device is controlled such that the medium is cut at a position with a margin maintained in the case where the significance portion and the trailing edge region overlap.

The outputting controller 46 transmits the image data from the image memory 43 to the image output device 20 only in a period in which a request for transmitting the image data is received and stops transmitting the image data when the request for transmitting ends. The outputting controller 46 releases the image memory 43.

Example of Operation of Image Processing Apparatus

Figure 7A:
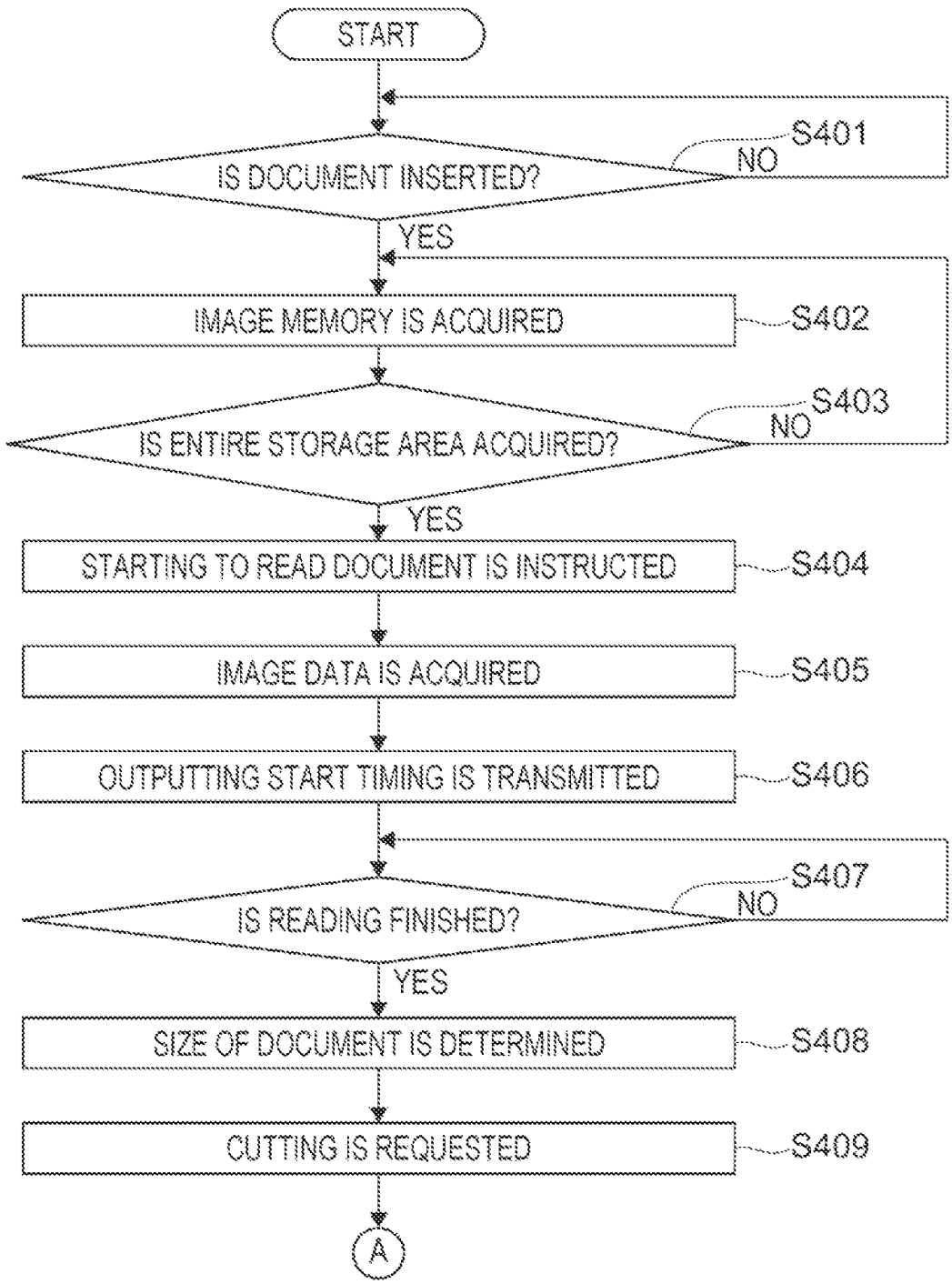
FIG. 7A is a flowchart of a reading routine of the image processing apparatus according to the exemplary embodiment of the present disclosure.

FIG. 7A to FIG. 8 are flowcharts illustrating an example of the operation of the image processing apparatus 30 according to the present exemplary embodiment. In the case described herein, the copy condition setting part 41 sets the synchronous cutting copy as the selection from the fixed form copy and the synchronous cutting copy, sets an equal size as the magnification, and sets roll paper as the paper. Examples of a method of preventing the effective image and the erasure region from overlapping include a method of changing the position at which the leading edge portion starts to be printed and a method of changing the position of cutting the trailing edge portion. In the example of the operation, however, a method of adding a margin image will be described as the method of preventing the effective image and the erasure region from overlapping.

FIG. 7A and FIG. 7B are flowcharts for the reading routine of the image processing apparatus 30. After the copy condition setting part 41 sets the various copy conditions, the image processing apparatus 30 performs the reading routine.

As for the image processing apparatus 30, as illustrated in FIG. 7A, the reading controller 42 first determines whether a document is inserted via the document entrance 100*a* (a step 401) and waits as it is if no document is inserted. If the document is inserted, and the sensor F1 detects the leading edge of the document, the reading controller 42 acquires the entire storage area in the image memory 43 as a storage area for storing the image data that is read from the document (a step 402). The reading controller 42 subsequently determines whether the entire storage area is acquired at the step 402 (a step 403) and performs a process at the step 402 again if the entire storage area is not acquired.

If the entire storage area is acquired at the step 402, the reading controller 42 instructs the document reading apparatus 10 to start to read the document (a step 404). As a result, the light detection sensors that are included in the reading sensor 110 start to scan the output signals and sequentially transmit the image data that is acquired every time scanning is repeated to the image processing apparatus 30. Consequently, the reading controller 42 acquires the image data (a step 405).

Subsequently, the outputting start timing transmission unit 44 waits for the reading controller 42 to start to input the image data into the image memory 43 and sets the outputting start timing of the image data in response to the first input of the image data (a request for outputting) (a step 406). For example, the outputting start timing transmission unit 44 calculates the wait time T such that a time at which reading is finished and a time at which outputting is finished are equal to each other as for the maximum document length and sets a time acquired by adding the wait time T into the current time at which the image data is inputted at the first time as the outputting start timing of the image data.

Subsequently, the reading controller 42 determines whether the document reading apparatus 10 finishes reading the document while continuing a process of acquiring the image data and inputting the image data into the image memory 43 (a step 407) and waits as it is if reading the document is not finished. When reading the document is finished, the reading controller 42 determines the size of the document (a step 408). For example, the reading controller 42 may determine the size of the document by detecting the length of the document by using the sensor F1 in the document reading apparatus 10 and detecting the width of the document by using a sensor, not illustrated, in the document reading apparatus 10.

Subsequently, the reading controller 42 performs a process for transmitting a request for cutting (a step 409). That is, the reading controller 42 sets the length of the document that is detected at the step 408 as the cut length of the copy paper.

Subsequently, as illustrated in FIG. 7B, the reading controller 42 determines the tentative paper size, based on the size of the document that is determined at the step 408 in FIG. 7A (a step 411). For example, the reading controller 42 may determine that the tentative paper size is equal to the size of the document.

Subsequently, the reading controller 42 determines whether a portion of the image data that is acquired at the step 405 in FIG. 7A and that overlaps the erasure region in the principal scanning direction is a margin, that is, whether the effective image is located in the portion (a step 412).

If the effective image is located in the portion that overlaps the erasure region in the principal scanning direction, the reading controller 42 sets roll paper that has a width more than that of the tentative paper size as the copy paper that is used (a step 413).

If the effective image is not located in the portion that overlaps the erasure region in the principal scanning direction, the reading controller 42 sets the roll paper that has the tentative paper size as the copy paper that is used (a step 414).

Subsequently, the reading controller 42 determines whether a portion of the image data that is acquired at the step 405 in FIG. 7A and that overlaps the erasure region in the sub scanning direction, that is, whether the effective image is located in the portion (a step 415).

If the effective image is located in the portion that overlaps the erasure region in the sub scanning direction, the margin image generation unit 45 generates a margin image that has the height of a portion at which the erasure region and the effective image overlap (a step 416). The margin image generation unit 45 adds the generated margin image into the image data (a step 417). For example, if the erasure region at the leading edge portion in the sub scanning direction and the effective image overlap, the margin image generation unit 45 adds a margin image that has the height of an overlapping portion therebetween into the image data at the leading edge. If the erasure region at the trailing edge portion in the sub scanning direction and the effective image overlap, the margin image generation unit 45 adds a margin image that has the height of an overlapping portion therebetween into the image data at the trailing edge. The image data to which the margin image is thus added is rewritten in the image memory 43. The margin image generation unit 45 increases the cut length that is set at the step 409 in FIG. 7A by the height of the added margin image (a step 418). That is, the margin image generation unit 45 sets the cut length that is increased by the height of the added margin image instead of the cut length that is set at the step 409 in FIG. 7A.

If the effective image is no located in the portion that overlaps the erasure region in the sub scanning direction, the reading controller 42 and the margin image generation unit 45 do not perform the steps 416 to 418. Through the above processing, the reading routine ends.

FIG. 8 is a flowchart illustrating the outputting routine of the image processing apparatus 30. The outputting routine is performed while the processes in FIG. 7A and FIG. 7B are performed.

As for the image processing apparatus 30, the outputting controller 46 first determines whether the reading controller 42 requests outputting (a step 451) and waits as it is if outputting is not requested as illustrated. When the outputting start timing is set at the step 406 in FIG. 7A (the request for outputting), the result of determination at the step 451 is "YES", and the outputting controller 46 causes the image output device 20 to prepare the operation thereof (a step 452).

Subsequently, the outputting controller 46 acquires a time by subtracting the paper delay time Td from the outputting start timing that is set at the step 407 in FIG. 7A, waits until the time (a step 453), and subsequently instructs the image output device 20 to start printing (a step 454). The paper delay time Td is a time required for the copy paper to reach the resist sensor 222 in front of the transfer unit 220 from paper supplying units (the cut paper supplying units 201 and 202 and the roll paper supplying unit 210). The paper delay time Td has a value that changes depending on a selection from the cut paper supplying units 201 and 202 and the roll paper supplying unit 210 among the paper supplying units. The roll paper supplying unit 210 is selected here. Accordingly, the paper delay time Td suitable for the roll paper supplying unit 210 is selected at the step 453, and a time at which an instruction for starting printing is transmitted is calculated based on the selected Td. Subsequently, the outputting controller 46 determines whether the image output device 20 requests to start to output the image data (a step 455).

As a result of an instruction for starting printing at the step 454, the copy paper is supplied to the image output device 20 from the roll paper supplying unit 210. When the copy paper reaches the position of the resist sensor 222, a request for starting to output the image data is transmitted from the image output device 20 to the image processing apparatus 30. In the case where the request for starting outputting is received before determination is made at the step 455, the outputting controller 46 starts to output the image data from the image memory 43 (a step 456).

Subsequently, the outputting controller 46 reads the cut length that is set at the step 409 in FIG. 7A or that is increased at the step 418 in FIG. 7B and transmits the cut length to the image output device 20 (a step 457). As a result, the image output device 20 requests the image processing apparatus 30 to transmit the image data in a period in which the received cut length of the copy paper is fed from the roll paper supplying unit 210. The outputting controller 46 transmits the image data in response to this request (a step 458), and the image output device 20 transfers an image in accordance with the transmitted image data.

The outputting controller 46 transmits the image data from the image memory 43 to the image output device 20 only in a period in which a request for transmitting the image data is received after transmitting the cut length at the step 457 and stops transmitting the image data when the request for transmitting ends (a step 459). The outputting controller 46 releases the image memory 43 (a step 460). Through the above processing, the outputting routine ends.

Processor

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor not limited to one described in the embodiments above, and may be changed.

Program

Processing that is performed by the image processing apparatus 30 according to the present exemplary embodiment is prepared, for example, as a program such as application software.

In this case, a program for carrying out the present exemplary embodiment causes a computer to perform a function of acquiring the read image of the document that is read by the document reading apparatus, and a function of controlling the image output device such that the read image is outputted to the medium with the significance portion and the edge region prevented from overlapping, and the length of the medium in the sub scanning direction is increased in the case where the significance portion of the read image and the edge region in the sub scanning direction in which the read image is outputted to the medium overlap.

The program for carrying out the present exemplary embodiment may be provided by using a communication unit or may be provided as a program that is stored in a recording medium such as a CD-ROM.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image processing apparatus comprising:
a processor configured to:
acquire a read image of a document that is read by a document reading apparatus; and
control an image output device such that the read image is outputted to a medium with a significance portion and an edge region prevented from overlapping, and a length of the medium in a sub scanning direction is increased in a case where the significance portion of the read image and the edge region in the sub scanning direction in which the read image is outputted to the medium overlap.

2. The image processing apparatus according to claim 1, wherein the processor is configured to control the image output device such that a margin image that has a length of an overlapping portion between the significance portion and the edge region in the sub scanning direction is added into the edge region of the read image and is outputted to the medium.

3. The image processing apparatus according to claim 2, wherein the processor is configured to control the image output device such that the medium is cut at a position suitable for a length of the margin image in the sub scanning direction.

4. The image processing apparatus of claim 1, wherein the edge region includes a trailing edge region of the read image in the sub scanning direction, and
wherein the processor is configured to control the image output device such that the medium is cut at a position with a margin that has a length of an overlapping portion between the significance portion and the trailing edge region in the sub scanning direction maintained in a case where the significance portion and the trailing edge region overlap.

5. The image processing apparatus according to claim 4, wherein the edge region includes a leading edge region of the read image in the sub scanning direction, and
wherein the processor is configured to control the image output device such that a margin image that has a length of an overlapping portion between the significance portion and the leading edge region in the sub scanning direction is added into the leading edge region of the read image and is outputted to the medium in a case where the significance portion and the leading edge region overlap.

6. The image processing apparatus according to claim 4, wherein the edge region includes a leading edge region of the read image in the sub scanning direction, and wherein the processor is configured to control the image output device such that the read image starts to be outputted to the medium from a position with a margin that has a length of an overlapping portion between the significance portion and the leading edge region in the sub scanning direction maintained in a case where the significance portion and the leading edge region overlap.

7. A non-transitory computer readable medium storing a program causing a computer to execute a process comprising:

acquiring a read image of a document that is read by a document reading apparatus; and controlling an image output device such that the read image is outputted to a medium with a significance portion and an edge region prevented from overlapping, and a length of the medium in a sub scanning direction is increased in a case where the significance portion of the read image and the edge region in the sub scanning direction in which the read image is outputted to the medium overlap.

8. A method comprising:

acquiring a read image of a document that is read by a document reading apparatus; and controlling an image output device such that the read image is outputted to a medium with a significance portion and an edge region prevented from overlapping, and a length of the medium in a sub scanning direction is increased in a case where the significance portion of the read image and the edge region in the sub scanning direction in which the read image is outputted to the medium overlap.

\* \* \* \* \*